United States Patent
Kasi et al.

(10) Patent No.: US 7,340,508 B1
(45) Date of Patent: Mar. 4, 2008

(54) EXPOSING PROCESS FLOWS AND CHOREOGRAPHY CONTROLLERS AS WEB SERVICES

(75) Inventors: Jayaram Rajan Kasi, San Jose, CA (US); Vinkesh Omprakash Mehta, Austin, TX (US); Raghunath Sapuram, Cedar Park, TX (US); Ramshankar Venkat, Santa Clara, CA (US)

(73) Assignee: Open Invention Network, LLC, Pound Ridge, NY (US)

( * ) Notice: Subject to any disclaimer, the term of this patent is extended or adjusted under 35 U.S.C. 154(b) by 837 days.

(21) Appl. No.: 10/246,512

(22) Filed: Sep. 18, 2002

(51) Int. Cl.
*G06F 15/16* (2006.01)
(52) U.S. Cl. ............... 709/219; 709/203; 709/217
(58) Field of Classification Search ......... 709/201, 709/202, 203, 205–207
See application file for complete search history.

(56) References Cited

U.S. PATENT DOCUMENTS

| | | | |
|---|---|---|---|
| 5,005,200 A | 4/1991 | Fischer | |
| 5,157,726 A | 10/1992 | Merkle et al. | |
| 5,159,630 A | 10/1992 | Tseng et al. | |
| 5,224,166 A | 6/1993 | Hartman, Jr. | |
| 5,311,438 A | 5/1994 | Sellers et al. | |
| 5,557,798 A | 9/1996 | Skeen et al. | |
| 5,680,613 A * | 10/1997 | Atsumi | 707/103 R |
| 5,790,677 A * | 8/1998 | Fox et al. | 705/78 |
| 5,805,889 A * | 9/1998 | Van De Vanter | 717/107 |
| 5,812,669 A | 9/1998 | Jenkins et al. | |
| 5,941,945 A * | 8/1999 | Aditham et al. | 709/205 |
| 6,049,785 A | 4/2000 | Gifford | |
| 6,072,942 A | 6/2000 | Stockwell et al. | |
| 6,084,590 A * | 7/2000 | Robotham et al. | 345/419 |
| 6,115,744 A * | 9/2000 | Robins et al. | 709/227 |
| 6,125,391 A | 9/2000 | Meltzer et al. | |
| 6,148,290 A | 11/2000 | Dan et al. | |
| 6,160,907 A * | 12/2000 | Robotham et al. | 382/154 |
| 6,185,734 B1 * | 2/2001 | Saboff et al. | 717/164 |
| 6,269,380 B1 * | 7/2001 | Terry et al. | 707/200 |

(Continued)

FOREIGN PATENT DOCUMENTS

WO    WO 200125954 A2 *  4/2001

(Continued)

OTHER PUBLICATIONS

Arkin, Assaf et al., "Web Service Choreography Inteface 1.0", Aug. 8, 2002, http://www.w3.org/TR/wsci/.*

(Continued)

*Primary Examiner*—Jason Cardone
*Assistant Examiner*—Thomas Duong
(74) *Attorney, Agent, or Firm*—Ernest J. Beffel, Jr.; Haynes Beffel & Wolfeld LLP

(57) ABSTRACT

The present invention relates to computer-based devices and methods supporting document exchange choreographies. More particularly, aspects of the present invention relate to devices and methods that facilitate evolution of systems by various combinations of choreography versioning, service versioning and document versioning. It provides for choreography management using a choreography agent and presents choreography-enabled interfaces to non choreography enabled applications. Additional aspects of the present invention include a graphical design tool and transparent aliasing of a host service as multiple context setting franchised services. Particular aspects of the present invention are described in the claims, specification and drawings.

10 Claims, 12 Drawing Sheets

U.S. PATENT DOCUMENTS

| | | | |
|---|---|---|---|
| 6,289,382 B1* | 9/2001 | Bowman-Amuah | 709/226 |
| 6,332,155 B1* | 12/2001 | Notani | 709/205 |
| 6,332,163 B1* | 12/2001 | Bowman-Amuah | 709/231 |
| 6,389,533 B1 | 5/2002 | Davis et al. | |
| 6,393,442 B1* | 5/2002 | Cromarty et al. | 715/523 |
| 6,397,191 B1* | 5/2002 | Notani et al. | 705/9 |
| 6,425,119 B1 | 7/2002 | Jones et al. | |
| 6,434,628 B1* | 8/2002 | Bowman-Amuah | 714/48 |
| 6,463,460 B1* | 10/2002 | Simonoff | 709/203 |
| 6,529,909 B1* | 3/2003 | Bowman-Amuah | 707/10 |
| 6,538,673 B1 | 3/2003 | Maslov | |
| 6,567,783 B1* | 5/2003 | Notani et al. | 705/9 |
| 6,589,291 B1* | 7/2003 | Boag et al. | 715/513 |
| 6,629,130 B2* | 9/2003 | Mertama et al. | 709/206 |
| 6,636,889 B1* | 10/2003 | Estrada et al. | 709/203 |
| 6,643,650 B1* | 11/2003 | Slaughter et al. | 707/10 |
| 6,684,214 B2* | 1/2004 | Bata et al. | 707/10 |
| 6,789,077 B1* | 9/2004 | Slaughter et al. | 707/10 |
| 6,789,126 B1* | 9/2004 | Saulpaugh et al. | 709/245 |
| 6,792,466 B1* | 9/2004 | Saulpaugh et al. | 709/229 |
| 6,842,903 B1* | 1/2005 | Weschler | 719/328 |
| 6,850,979 B1* | 2/2005 | Saulpaugh et al. | 709/225 |
| 6,862,594 B1* | 3/2005 | Saulpaugh et al. | 707/10 |
| 6,868,447 B1* | 3/2005 | Slaughter et al. | 709/225 |
| 6,898,618 B1* | 5/2005 | Slaughter et al. | 709/203 |
| 6,917,976 B1* | 7/2005 | Slaughter et al. | 709/226 |
| 6,918,084 B1* | 7/2005 | Slaughter et al. | 715/513 |
| 6,950,875 B1* | 9/2005 | Slaughter et al. | 709/230 |
| 6,961,760 B2* | 11/2005 | Li et al. | 709/219 |
| 6,970,869 B1* | 11/2005 | Slaughter et al. | 707/10 |
| 6,973,493 B1* | 12/2005 | Slaughter et al. | 709/225 |
| 6,980,993 B2* | 12/2005 | Horvitz et al. | 707/102 |
| 6,990,513 B2* | 1/2006 | Belfiore et al. | 709/203 |
| 7,010,573 B1* | 3/2006 | Saulpaugh et al. | 709/206 |
| 7,013,426 B1* | 3/2006 | Ingersoll | 715/523 |
| 7,016,966 B1* | 3/2006 | Saulpaugh et al. | 709/230 |
| 7,020,697 B1* | 3/2006 | Goodman et al. | 709/223 |
| 2002/0059425 A1* | 5/2002 | Belfiore et al. | 709/226 |
| 2002/0089504 A1* | 7/2002 | Merrick et al. | 345/473 |
| 2002/0120704 A1* | 8/2002 | Karp et al. | 709/207 |
| 2002/0143819 A1* | 10/2002 | Han et al. | 707/513 |
| 2002/0147645 A1* | 10/2002 | Alao et al. | 705/14 |
| 2002/0169803 A1* | 11/2002 | Sampath et al. | 707/513 |
| 2002/0174125 A1* | 11/2002 | Lucovsky et al. | 707/100 |
| 2002/0178211 A1* | 11/2002 | Singhal et al. | 709/201 |
| 2002/0194227 A1* | 12/2002 | Day et al. | 707/523 |
| 2003/0046583 A1 | 3/2003 | Goldman et al. | |
| 2003/0079029 A1* | 4/2003 | Garimella et al. | 709/229 |
| 2004/0034540 A1* | 2/2004 | Chen et al. | 705/1 |

FOREIGN PATENT DOCUMENTS

| | | |
|---|---|---|
| WO | WO 01/33369 A1 | 5/2001 |

OTHER PUBLICATIONS

Cabrera, Felipe et al. "Specification: Web Services Transaction (WS-Transaction)", Aug. 9, 2002, http://www.ibm.com/developerworks/library/ws-transpec.*

White Paper, "Plug and Play Business Software Integration The Compelling Value of the Open Applications Group" Open Applications Group, Copyright 2000, pp. 1-15.

Open Applications Group White Paper Document No. 20010301, Best Practices and XML Content for eBusiness and Application Integration, OAGIS Extensions Release 1.1, 2001,pp. 1-34.

VORDEL Web Services Security: Knowledgebase, http://www.vordel.com/knowledgebase/vordel_view1.html, printed Sep. 11, 2002, 2 pages.

Jones, Information Security article, Jan. 2002, Authorization / EAM Ain't Easy http://www.infosecuritymag.com/2002jan/features_eam.shtml, 12 pages.

WebServices Framework & Assertion Exchange Using SAML, 5 pages, http://www.w3.org/2001/03/WSWS-popa/paper23/, printed Sep. 11, 2002.

GLUSHKO article: Advanced Technology Program Close Out Performance Report: Project Title: Component-Based Commerce: The Interoperable Future, Apr. 14, 2000, 8 pages.

GLUSHKO article: ATP Close Out Performance Report: Component-Based Commerce: The Interoperable Future, 9th Revision, modified Jan. 31, 2000, 57 pages.

Editors: Dan Brickley and R.V. Guha, Resource Description Framework (RDF) Schema Specification, W3C Proposed Recommendation Mar. 3, 1999, W3C XP-002203858, available at http://www.w3.org/TR/1999/PR-rdf-schema-19990303, 1-29.

Editors: David Beech et al., "XML Schema Part 1: Structures", W3C Working Draft May. 6, 1999, W3C XP-002203859, available at http://www.w3.org/1999/05/06-xmlschema-1, 1-53.

Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.

Kent Brown, "Biztalk: Fluent in E-Business", XP-002203861, 1-6, Dec. 1999.

W. Yeong, T. Howes, S. Kille, "Lightweight Directory Access Protocol", ISODE Consortium, Mar. 1995, pp. 1-19.

R. Moats, "URN Syntax", AT&T, May 1997, pp. 1-7.

Nils Klarlund, Anders Moller, Michael I. Schwartzbach, "Document Sructure Description 1.0", AT&T and BRICS 1999, XP-002203865, pp. 1-34.

K. Narayanaswamy, K.V. Bapa Rao, "An Incremental Mechanism for Schema Evolution in Engineering Domains", IEEE 1988, pp. 294-300.

Editors: Tim Bray, Jean Paoli, C.M. Sperberg-McQueen, "Extensible Markup Language (XML) 1.0", World Wide Web Consortium Dec. 8, 1997, W3C XP-002203864, available at http://www.w3.org/TR/PR-xml-971208, 1-32.

A Davidson, M. Fuchs, M. Hedlin, M. Jain, J. Koistinen, C. Lloyd, M. Maloney, K. Schwarzhof, Schema for Object-Oriented XML 2.0, W3C Note Jul. 30, 1999, W3C XP-002203857, available at http://www.w3.org/1999/07/NOTE-SOX-19990730, 1-22.

Schneier, Bruce, Applied Crytopgraphy 1966, John Wiley and Sons, Inc., pp. 40-41.

Cover Pages: Web Services Description Language (WSDL), Technology Reports, 31 pages, Jul. 9, 2002, located at http://xml.coverpages.org/wsdl.html.

* cited by examiner

Fig. 11

Collaborative Web Services Environment

User: Tim Fuschino (tfuschino)  Organization: Provider Organization    Help  Log Off  Profile    COMMERCE ONE.

My Center / Administration / Sourcing / Contract Management / Dynamic Bidding / Procurement / Business Document Manager / Reports Home | Services | Organization | Connectivity | Process Administration |

Customize Document Exchange Service Activity

[Save] [Cancel]

Service Activity Details

| Name | Read Only Name |
|---|---|
| Operation Type | Request-Response (Receive and Send) |
| Description | Description |
| Supports Choreographies | Yes |
| Message Support | Specific messages-document style |
| SOAP Action | text |

Privilege Details — 1201

This service activity will be registered as a privilege that can be assigned to user accounts.

| Privilege | Applicable Scope Type | Usage | Other Service Activities |
|---|---|---|---|
| Privilege 1 | Oganization Unit | Can be used in user roles or service roles | Activity 1, Activity 2, Activity 4 |
| Privilege 2 | User | Can only be used in service roles | Activity 1, Activity 3 |

Messaging Policies — 1202

| | |
|---|---|
| Is asynchronous delivery receipt required?^^^Only if the service policy "Is asynchronous delivery receipt accepted by this service?" =yes^^^ | No |
| Reliability Level Required | Best effort |
| Allow data mining through message content? | Yes |
| Allow message archival? | Yes |
| Message Time to Live (if a time is specified, message will not be delivered if this time has passed) | Please select |

Input Message ^^^not here for operation type=send only^^^ — 1210

| Name | Read only name |
|---|---|
| URI (Globally Unique Name) | Name — 1213 |
| Signing Policy | Required |
| Encryption Policy | Optional |

Required Input Message Entry Parts — 1214

| Part Name | Part Type | Actions |
|---|---|---|
| Part 1 | XML Document | 🔍 |
| Part 2 | External Reference: Unspecified mime type | 🔍 |
| Part 3 | Other Attachment: Image/jpeg | 🔍 |

Output Message ^^^not here for operation type=receive only^^^ — 1220

| Name | Read only name |
|---|---|
| URI (Globally Unique Name) | Name — 1223 |
| Signing Policy | Required |
| Encryption Policy | Optional |

Required Output Message Entry Parts — 1224

| Part Name | Part Type | Actions |
|---|---|---|
| Part 1 | XML Document | 🔍 |
| Part 2 | External Reference: Unspecified mime type | 🔍 |
| Part 3 | Other Attachment: Image/jpeg | 🔍 |

Collaborative Web Services Environment

User: Tim Fuschino (tfuschino)  Organization: Provider Organization  COMMERCE ONE
Help  Log Off  Profile My Center / Administration / Sourcing / Contract Management / Dynamic Bidding / Procurement / Business Document Manager / Reports Home | Services | Organization | Connectivity | Process Administration |

Edit Franchise Service Details

[Save] [Cancel]

Service Details

| | |
|---|---|
| Service Package | [sp] |
| Service Definition | [selected service definition URI] |
| Host Service | [selected service] |
| Host Service Provider | [provider] |
| Description | [description] |
| Connector | connectorname |
| DD Name | DD name1 ^^^ DDname and DDID rows to be displayed only if DD name is specified ^^^ |
| DDID | [                                      ] If DD name is specified, and DDID is left blank, the system will generate an unique DDID. |
| Status | ⦿ Inactive  ○ Active<br>Active from: [March] [31] [2002] Time: [Hour] [Minute] PST ^^^defaults to now^^^ |
| *Franchising Party | [                        ] 🔍 |
| Associated Service Classifications | [Delete Selected] [Add]<br><br>\| ☐ \| Name \| Description \|<br>\|---\|---\|---\|<br>\| ☐ \| Classification1 \| [description] \|<br>\| ☐ \| Classification2 \| [description] \|<br><br>[Delete Selected] [Add] |
| Subscription Required | ⦿ Yes  ○ No |
| Subscription Approval by Provider Required | ⦿ Yes  ○ No |
| Supported Public Choreographies | \| Choreography Identifier \| Display Name \| Standard \| Publishing Authority \| Description \|<br>\|---\|---\|---\|---\|---\|<br>\| Choreography1 \| Choreography1 \| ebXML-BPSS \| RosettaNet \| [description] \|<br>\| Choreography2 \| Choreography2 \| ebXML-BPSS \| ebXML \| [description] \| |

Visibility

[Visible to all parties in community ▼]
^^^if "Visible to specific community networks/public registries" or "Visible to selected party roles in community" or "Visible to selected parties" is selected, use below type of selector^^^

Selected
Party 1
Party 2      [Add]
Party 3      [Remove]

Specify Supported Document Exchange Service Activity Details

If you need to customize the document exchange activities, click on the "Edit" button in the "Actions" column.

| Service Activity | Actions |
|---|---|
| Activity 1 | 🔍📄 |
| Activity 2 | 🔍📄 |

Messaging Policies

| | |
|---|---|
| Is asynchronous delivery receipt accepted by this service? | Yes |
| Envelope Protocol | C1 SOAP 1.0 |

EXPOSING PROCESS FLOWS AND CHOREOGRAPHY CONTROLLERS AS WEB SERVICES

RELATED APPLICATIONS

This application is related to the commonly owned U.S. application Ser. No. 10/199,967, entitled "Electronic Commerce Community Networks and Intra/Inter Community Secure Routing Implementation", by inventors Raghunath Sapuram, Jayaram Rajan Kasi, Todd Klaus, Christopher Crall, and Joseph Sanfilippo, filed on 19 Jul. 2002 and incorporated herein by reference. This application also is related to the commonly owned U.S. application Ser. No. 10/199,963, entitled "Registry Driven Interoperability and Exchange of Documents", by inventors Christopher Todd Ingersoll, Jayaram Rajan Kasi, Alexander Holmes, Michael Clark, Ashok Aletty, Sathish Babu K. Senathi, and Helen S. Yuen, filed on 19 Jul. 2002 and incorporated herein by reference. This application further is related to the commonly owned U.S. application Ser. No. 10/222,008, entitled "Dynamic Interface between BPSS Conversation Management and Local Business Management", by inventors Qiming Chen, Meichun Hsu, and Vinkesh Mehta, filed on 15 Aug. 2002 and incorporated herein by reference.

This application is related to two commonly owned U.S. patent applications filed the same day as this application, entitled "Dynamic Negotiation Of Security Arrangements Between Web Services", by inventors Symon Szu-yuan Chang, Joseph S. Sanfilippo, Jayaram Rajan Kasi, and Chris Crall and "Dynamic Interoperability Contract for Web Services", by inventors Jayaram Rajan Kasi, Rashmi Murthy, Symon Szu-yuan Chang, Todd Klaus, and Helen Yuen. The two applications filed the same day are hereby incorporated by reference.

COPYRIGHT NOTICE

A portion of the disclosure of this patent document contains screen images that are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to computer-based devices and methods supporting document exchange choreographies. More particularly, aspects of the present invention relate to devices and methods that facilitate evolution of systems by various combinations of choreography versioning, service versioning and document versioning. It provides for choreography management using a choreography agent and presents choreography-enabled interfaces to non choreography enabled applications. Additional aspects of the present invention include a graphical design tool and transparent aliasing of a host service as multiple context setting franchised services. Particular aspects of the present invention are described in the claims, specification and drawings.

Business-to-business (B2B) and application-to-application (A2A) electronic commerce are replacing former protocols for electronic data interchange (EDI). As businesses strive to improve their efficiency with B2B and A2A systems, a number of incompatible platforms and competing standards have emerged. Among compatible standards, gaps remain to be filled. For instance, the industry has defined what a simple web service is. Standards related to simple Web service include UDDI, WSDL, XSDL and SOAP. However, these standards do not fully meet the security, reliability, manageability, and choreography requirements for practical B2B and A2A electronic commerce. In this context, choreography of message exchanges among services includes setting a pattern for the choreographed exchange and tracking messages that are part of the exchange with an identifier, such as a conversation ID. Choreography in particular presents competing platforms with numerous options and configuration issues. Collaborative web services and their choreographies are expected to evolve as non-web businesses do. There is no any comprehensive or unified device or method that dynamically resolves issues arising from evolution.

One way of implementing B2B and A2A electronic commerce is use of web services. Web services are a fundamentally new way of exposing functionality in a modular way over the web. At the present stage of web service evolution, much attention is focused on document exchange and RPC web services. An RPC web service supports an RPC programming paradigm where the invoker invokes a web service by invoking something that looks like a procedure call with in/out parameters.

Current implementations of web services typically conform to three standards. UDDI is a registry standard for discovering web services based on search criteria and downloading its interface. WSDL is a interface standard that defines the messaging interface of a web service. SOAP is a envelope protocol standard with defined bindings to HTTP (S) transports that are used to carry the payloads over the wire. Web services typically rely on the XML standards like XSDL, Xlink, Xbase, and Xpointer and general web standards like HTTP(S) and URI.

Most of the web services today are simple web services. Simple web services use synchronous unreliable HTTP(S) transports and have no support for security except for transport level security, or agreed to security information in the payload understood privately by the communicating parties. Simple web services contain operations. Invoking a web service means invoking an operation of the web service. An operation might be designed to accept a one-way message or to support a request/response paradigm where the invoker blocks for the response and the invoked service immediately responds. Simple web services may use the RPC programming paradigm or a document based programming paradigm.

An emerging challenge in standard-compliant web services is to define high performance web services to improve the business performance of the enterprise. Such web services will support invocation with reliability (exactly once), asynchronous transports like SMTP, JMS, privacy (encryption), integrity (signing), authentication and authorization, and routing.

Another emerging challenge will be to define collaborative web services. These web services might hold long duration interactions with other web services and might invoke non collaborative web services without a choreographed, conversational context. Such collaborative web services will require support for correlating related messages in a conversation and support for a return address.

There are a number of industry initiatives to extend standards applicable to B2B and A2A electronic commerce. Choreography efforts include ebXM BPSS from OASIS, WSFL from IBM, and XLANG from Microsoft. Conversation efforts include ebXML/TRP from OASIS and Microsoft's WS-routing. Additional efforts include BPEL4WS (Business Process Execution Language for Web Services), from IBM, Microsoft and BEA Systems, and Web Service Choreography Interface, from Sun Microsystems, WSCL (Web Services Conversation Language), and BPML (Business Process Modeling Language). So many choreography efforts are under way that some industry leaders in September 2002 asked the W3C standards body's Web Services Architecture Working Group to set a standard that will resolve incompatibilities. For reliability, there are proposals from Microsoft, ebXMUTRP from OASIS, and HTTPR from IBM. W3C is addressing standardization in all of these areas. Key industry players have formed a rival consortium called WSI. However, they have not addressed the service evolution and choreography issues.

Accordingly, an opportunity arises to develop methods and devices that support evolving document exchange choreographies.

SUMMARY OF THE INVENTION

The present invention relates to computer-based devices and methods supporting document exchange choreographies. More particularly, aspects of the present invention relate to devices and methods that facilitate evolution of systems by various combinations of choreography versioning, service versioning and document versioning. It provides for choreography management using a choreography agent and presents choreography-enabled interfaces to non choreography enabled applications. Additional aspects of the present invention include a graphical design tool and transparent aliasing of a host service as multiple context setting franchised services. Particular aspects of the present invention are described in the claims, specification and drawings.

BRIEF DESCRIPTION OF THE DRAWINGS

FIGS. 10-17 are screen shots of one embodiment that practices aspects of the present invention.

FIG. 10 is a manage host packages screen.

FIG. 11 depicts parts of registering a new host service.

FIG. 12 depicts a screen used to edit document exchange activities.

FIG. 13 depicts a screen used verify or modify signing and encryption policies.

FIG. 14 depicts a screen used to register a host service package.

FIG. 15 depicts a screen used to select a new package to franchise.

FIG. 16 depicts a screen used to select the franchise options.

FIG. 17 depicts a screen used to edit service details.

DETAILED DESCRIPTION

Figure 1:
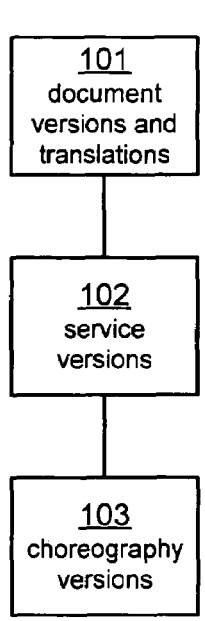
FIG. 1 illustrates the capability to dynamically determine document versions and translations, service versions and choreography versions.

The following detailed description is made with reference to the figures. Preferred embodiments are described to illustrate the present invention, not to limit its scope, which is defined by the claims. Those of ordinary skill in the art will recognize a variety of equivalent variations on the description that follows.

Communities and networks of communities are one environment in which computer-assisted devices and methods implementing document exchange choreographies are useful. Among these communities, a community maintains a local registry that includes information such as users, companies, services and connectors that are part of the community. The community can be a marketplace, an enterprise or a sub enterprise. Communities can belong to one or more community networks. Typically, communities and networks have some common business interest. Interoperation is between member communities in one or more community networks. A network of communities makes available a global registry of communities. The global registry permits lookup of the community and determination of one or more routes to that community, or to external connectors through which the electronic commerce documents bound for the community may be routed. Documents routed from one community to another may be routed directly between external connectors for the two communities or indirectly through one or more intermediary communities. Business and security rules for transactions involving the communities also can be defined and maintained in community registries. Connector is a general term for applications that communicate with other applications. Connectors may communicate on a peer-to-peer (P2P) basis or on a directed basis through other connectors that function as hubs, gateways, external ports, central connectors, etc. Connectors that communicate P2P are able to communicate with other connectors that use the same transport/envelope protocols. Connectors that communicate P2P optionally may enlist the assistance of other hub connectors that perform translation services, when trying to communicate with a connector that does not use the same transport/envelope protocol. Connectors that communicate on a directed basis communicate through hub connectors according to routing rules. Routing rules among connectors can be mapped in a directed graph, supporting one or more hub and spoke topologies for one or more transport/envelope protocols. A hub and spoke topology directs communications along spokes to hubs, in one or more tiers. This facilitates centralized services such as billing, business intelligence collection, tracking, auditing, accounting, or others. Multiple hub and spoke organizations may overlay the same connectors to support different transport/envelope protocols and technologies. For instance, a stronger hub and spoke organization may be required to use Sonic as a transport technology than to use HTTP or HTTPS. Optionally, communication routes may depend on whether the source and destination are part of the same community. Within a sub-community (which may include the whole community), centralized functions may be unneeded and P2P communications permitted among connectors that otherwise are directed to communicate with parent connectors when communicating with destinations in other sub-communities.

Connectors may be labeled simple connectors (sometimes simply called connectors), hubs (sometimes called gateways or routers) or central connectors. Alternatively, they may be described functionally. Simple connectors are directed to communicate via hub connectors, except when they are permitted to communicate P2P among connectors in the same sub-community. So-called hubs are used by connectors that are explicitly directed or linked to them. Hubs may serve more than one function and, accordingly, may appear more than once in a route from a source to a destination. Hubs forward electronic commerce documents or messages. Hubs also may translate among transport protocols that support a common envelope protocol. For instance, a hub may translate envelope protocols and also implement a different transport protocol upon transmission than upon receipt. A central connector is a special case of a hub, which can be used by connectors that are not explicitly directed or linked to them. A central connector is useful, for instance, to carry out translation functions when traversing connectors from a source according to routing rules does not lead to any hub that supports the transport/envelope protocol used by the destination.

In the standards context, WSDL is a standard-based language used to define so-called service definitions (which WSDL calls porttypes), service instances (services), and connectors (ports). A service definition is like a class definition. WSDL names the service type, defines a set of operations for the service definition, which are essentially methods of the service, and defines the input/output messages of the operations. Operation types specified by WSDL include notification (one outward bound message), one-way (one inward bound message), solicit/response (synchronous, with one outward message followed by one inward message) and request/response (synchronous, with one inward message followed by one outward message). WSDL does not deal with choreography of interactions between services.

Aspects of the present invention go well beyond WSDL to address choreographed operations in a service. Collaborative operations are invoked by collaborative interactions, where an operation in one service instance invokes an operation in another service instance. The collaborative interactions between two service instances are part of a single conversation, where a conversation is a bi-directional flow of messages and is a choreography instance. A message in a conversation typically includes a conversation ID, the choreography that applies, and identification of or a return address to the initiating service/operations.

FIG. 1 illustrates the capability, combining several aspects of the present invention, to dynamically determine document versions and translations 101, service versions 102 and choreography versions 103, for a particular message exchange choreographed as a conversation. These dynamic determinations are described in some of the related applications and below.

A message in WSDL has a name, and a set of parts. Each part has a name, a MIME content type, and a schema definition for the part if XML.

The present invention adds the concept of a document family, instead of an explicit scheme definition for an XML part, which supports dynamic determination of document versions. A document family is a set of document versions whose scheme defines the document structure. This allows two interacting services to support different versions of the document. Version transformation logic is provided to transform to the source document to the required target document schema. This allows evolution of document versions without upgrading all services in the network that interact with each other using that document. This is so-called document version interoperation, which is further described in the Registry Driven Interoperability and Exchange of Documents application, identified above.

The present invention introduces the concept of a service definition version, which also can be dynamically determined. A new version can add new optional parts or delete existing optional parts to an existing in/out parameter or document and can add new operations to an earlier version of a service. Service instances using the earlier version can correctly address with the upgraded, new version of the service instance because the version number is not part of the service definition name in the message address. (An address typically includes is a party/service definition name/ operation.) In general, service definitions are templates for service instances (sometimes simply called services) that follow the definitions. Defining service template is like defining a type, while defining a service instance is like defining a variable of that type. A service definition has a name and version and defines the list of activities in the service along with one or more activity interfaces. The interface does not explicitly identify the documents supported, but at least identities the document family supported. A document family is a set of documents with the same business function. For example "purchase order" is a document family and xCBL3.5 purchase order and Rosettanet 1.0 purchase order are members of that family. Service definitions may be established by a community administrator, may be adopted from a vendor such as Commerce One, or, in the future, may be defined by standards bodies. Service instances complete the interface definition by specifying the actual versions documents used. The instance also specifies the policies of the service, and the CP offering the service. It also specifies the connector it is hosted in. Messages are sent and received by service instances. Preferably, activities in a service instance are hosted in a single connector.

Choreography definition languages generally define a flow of messages between roles. WSDL defines service interfaces of the roles. But the choreography definition languages have not merged with WSDL. Missing is a clear binding between a choreography and a service. One aspect of the present invention includes mapping a choreography role to a service instance and a choreography message to an in/out parameter of a service operation. This is more fully discussed in the Dynamic Interface between BPSS Conversation Management and Local Business Management application, identified above.

The present invention allows a service definition to define a set of choreographies (identified by name, for example) that the service supports and the role in that choreography that can be dynamically determined. A service instance will indicate the subset of choreographies that it supports and may indicate an order of preferences among supported choreographies. At runtime, an intersection of supported choreographies among participating service instances is computed and a particular version of a choreography is selected for use in the message exchange. The preferences of one or more services can be factored into the decision of which choreography version to use. Rules such as initiator wins, respondent wins, latest version wins, earliest version wins or a weighting of preferences might be used in the factoring. Alternatively, an agreement between the two services can be predefined that specifies the choreography version to use. All of the choreography participants use the same choreography for all subsequent messages in the choreographed conversation. This allows choreographies to evolve without requiring all services in the whole network to be upgraded. This is so-called choreography version interoperation. This interoperation is achieved independent of the language used to describe the choreography, but does depend on the services understanding the meaning of a choreography from its name.

Figure 2:
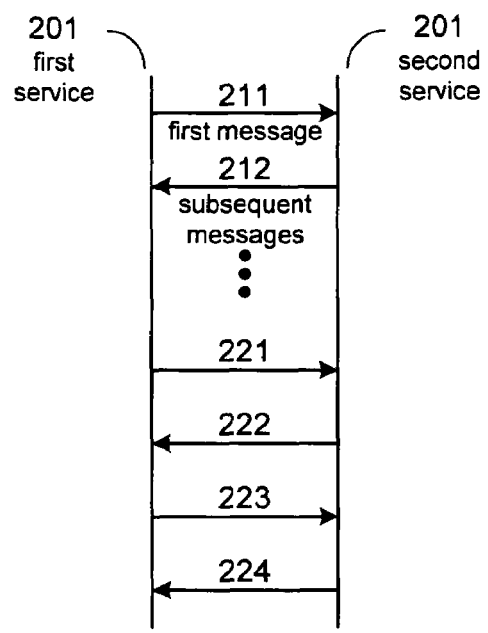
FIG. 2 illustrates how messages exchange regarding service versions.
Figure 3:
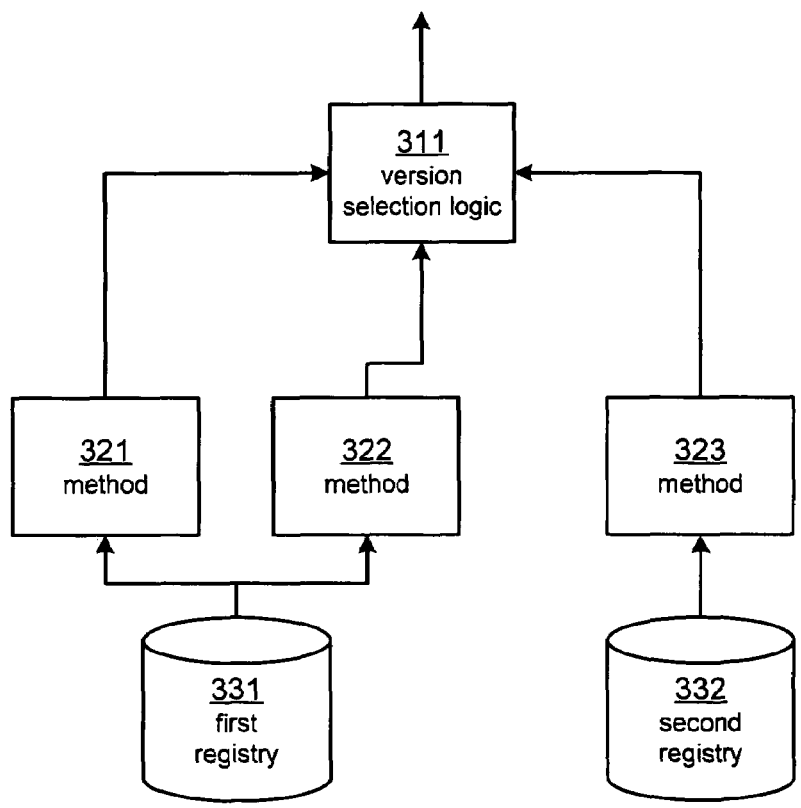
FIG. 3 illustrates reference to one or more registries is used to discover information for negotiations.

Two methods of selecting a choreography version or discovering a service version are illustrated in FIGS. 2 and 3. In FIG. 2, messages are used to exchange information about versions between a first service 201 and a second service 202. This approach may be extended to more than two services with a first message sent to all of the other services or with an additional first message being sent from the second or subsequent services to the other services. In choreography, for instance, the first message 211 in differing variations and versions of a choreography are substantially the same. Messages may differ slightly, due to document version considerations. Other minor variations in the first message may be allowed, while the first message remains compatible with all choreography versions. After the choreography used is selected in the first message, all subsequent messages in either direction between the services are part of this choreography. After a choreography version is selected, subsequent messages 212-224 conform to the selected choreography. In FIG. 3, reference to one or more registries is used to discover information about versions supported by a first service and a second service. The service local to the discovery process may store version information in a first registry 331 that is accessible to a method 321. The remote service would store version information in second registry 332 that is accessible to a method 323. In some cases, the remote service's information would be in the first registry 331 and accessible to a method 322. For instance, if the first and second services were in the same community and relied on the same registry. Or, if the first and second services had had recent contact and the first service cached the second service's information in the first registry. Information about versions supported by both services would be considered by version selection logic 311.

Thus, aspects of the present invention can be combined in several ways to dynamically determine some or all of document versions, service versions and choreography versions. Implemented in accordance with the present invention, a web service can be substantially updated and retain interoperability with other services that have not been similarly updated.

Further aspects of the present invention enable complex choreographies and business processes to be defined and executed between distributed collaborative web services across the Internet or another network, in so-called peer-to-peer interactions or collaborative interactions. It also supports the standard client/server interactions (or non collaborative interactions) that are common in legacy web services implementations. In peer-to-peer interactions, choreography support for correlates related messages exchanged among services and includes return addresses in messages of the conversation.

A collaborative service might have a virtual conversation with a non collaborative web service or other application interface. Basically the two services use client/server interactions with each other and know out of band the return address. The services correlate messages using application logic that examines the message payloads.

Collaborative services have zero or more associated contexts. New contexts are created by one or more trigger operations. Alternatively a context may be initiated spontaneously (from a messaging standpoint). Subsequent non-trigger operation initiations are tied to this context. A process flow instance is the context referred to. One operation kicks off the process instance and all subsequent messages relate to this instance. This context helps in having a bi-directional conversation with an initiator and bi-directional conversation with other services driven by the context. For non-collaborative services, each operation is complete in itself, the initiator could be any program and need not be a service, and it is independent of the invocation of every other operation in the service.

More generally, there are two types of message interactions between parties. A peer-to-peer message is typically associated with a choreography. In a peer-to-peer interaction, a few additional pieces of information are provided. A return address is provided, typically identifying the sending CP, service definition, and activity definition. Message correlation data is provided, such as a conversation ID and choreography ID and refers to ID. The return address identifies where the invoked service should respond. To further assist this service, the applicable choreography used for this interaction may be returned to both services on each message in the conversation. The conversation ID has the same value for every message in the conversation between two services. This will allow the services to easily correlate related messages. The choreography ID is selected on the first message and stays the same for the conversation. The refers to ID refers to the message ID of the message to which this is the response. A single message might have multiple responses.

The second type of message interaction is a client/server interaction (also called non-collaborative interaction.) In a client/server interaction, there typically is no sending service/activity. The request and the optional single response typically completes the interchange and subsequent client/server interactions are unrelated to this one.

One special aspect of client/server is transformation support for the response in a request/response invocation. In a peer-to-peer interaction the sending service says in its interface what document it expects in the response. However for client/server, this is not the case, and the requester has to say in the request the documents it expects in the response. If the requestor does not specify the expected document for a part, the document as generated by the responder is sent without any transformation.

A service may include a plurality of document exchange activity interfaces. A document exchange activity interface may be defined both as part of a service definition and (customized) when the service instance is registered. An activity is described by its interface and its policies. UI services, for instance, may register their activities in the registry for privilege determination, and other access control information such as single sign on web agents, and resource paths.

Figure 4:
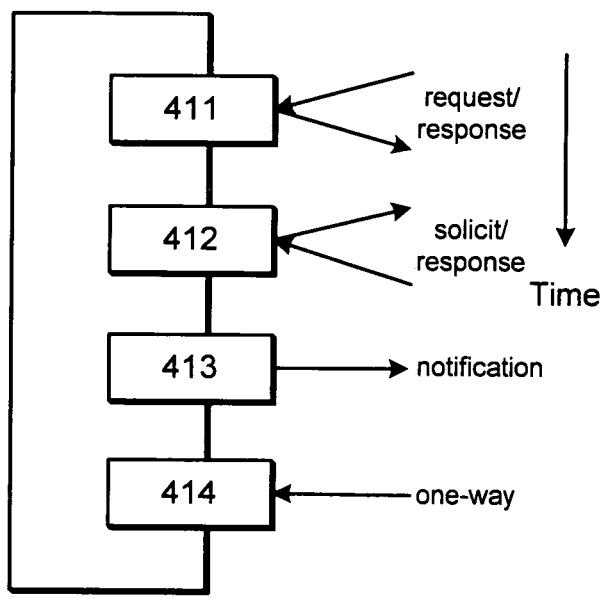
FIG. 4 illustrates the four types of activities.

An activity can be of four types, illustrated in FIG. 4. A request/response 411: The activity receives a request and responds. A solicit/response 412: This is the inverse interface of a request/response. A solicit response activity may invoke a request/response activity in another service instance. One-way 414: This is an activity that receives an asynchronous message. Notification 413: This is the inverse interface of a one-way. A notification activity invokes a one-way activity in another service instance. These definitions are consistent with WSDL.

The input or output to an activity is called a message. A message consists of multiple parts. Parts are described in the following way. The part name is a unique name for the part that is reused for every message from/to the activity for that part. The part type could be an XML part, or a part that is described by a MIME type. If the part does not have a MIME type defined, then the MIME type for the part can be supplied at run time by the invoker. The part location specifies whether the part is in the body, or an attachment. Alternatively, it may be in a message header or external to the message and the message only refers to it. A part may be required or optional. A root indicator: There should be one root part in a message. This typically is the main theme of a message and the typically is an XML part. The root part indicates the starting point of traversal to find the other parts. It may include references to other parts, but not necessarily all of them can be discovered by traversing from the root part. A message also may include a document ID list. Any part (XML or non XML) can belong to a document family. Associated with members of a document family (called document Ids) are descriptor information, optionally a schema, and optionally transformation maps of various types from/to this member. Document family metadata is registered independently of services.

Within a choreographed service, a process flow can be used to coordinate activities on opposite sides of the interface. The concept of a process flow, which is defined using design tools and the definition executes in a process engine, has been used in other contexts. Commerce One, for instance, has a process flow solution called CPM. A process defines a flow with potential branching points and parallel threads of execution. A process instance has associated with it a context and is initiated by some event and is long lasting. This context goes through a series of state transitions triggered by other events and the process itself can initiate events as part of the flow. The events may include UI interactions, document exchange events (sending or receiving messages with document payloads), a change in the context state or associated database state, or invocation of business logic.

Figure 5:
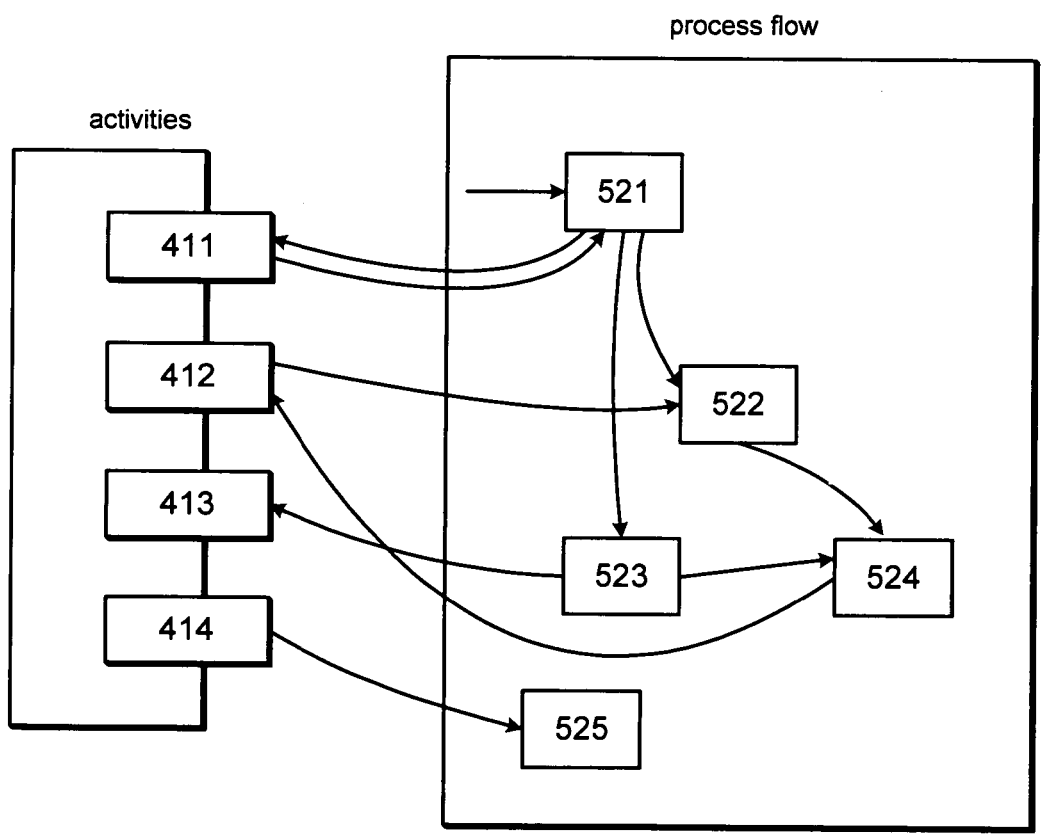
FIG. 5 illustrates interactions between activities and an internal process.

FIG. 5 illustrates interactions between activities and an internal process. The activities 411 through 414 exchange messages with the process flow from 521 through 525. The process flow steps pass messages among themselves. In another instance, the process flow could include branching and parallel execution of processes.

Figure 6:
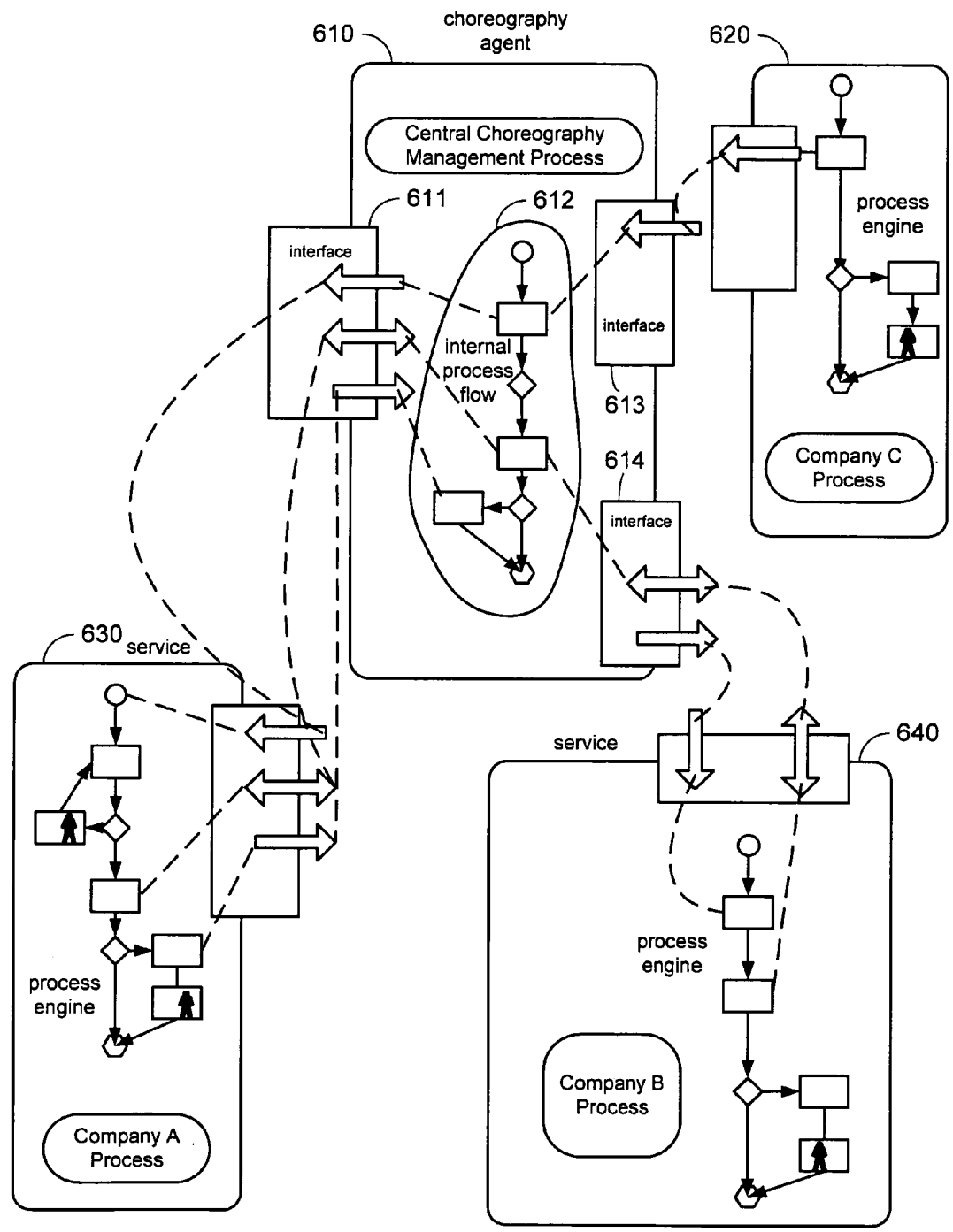
FIG. 6 illustrates an internal process flow executing in a process engine used to construct a choreography agent.

An internal process flow executing in a process engine also can be used to construct a choreography agent that centrally manages choreographies, as illustrated in FIG. 6. Choreographies can be centrally managed by making all messages flow through a choreography agent 610 that, itself, appears as a collaborative web service and utilizes an internal process flow 612. Adapted to a choreography agent, a message from service 630 to service 640 is changed to be a message from service 630 to the intermediate service 610, which forwards it to service 640. An asynchronous response from service 640 back to service 630 is changed to be a message from service 640 to the intermediate service 610, which forwards it to service 630. The choreography agent 601 includes interfaces 611, 613, 614 through which messages are passed. An internal process flow 612 can be used to track the status of one or more choreographies. Some or all of the internal process flow steps may store information in a transaction rollback log, to be used in case the choreographed message exchange terminates without completion. Interfaces can be added to support querying the status of one or more choreography instances that are being coordinated through the choreography agent. Similarly, activity statistics can be compiled during choreography coordination and reported through an interface. This centralization allows the status of the choreography to be queried easily for tracking. Error handling and error compensation actions can be more easily implemented. When the intermediate service is implemented as a process flow, the choreography is likely to be globally correct, because the internal process flow conforms to the process definition. Global checking of the choreography for correctness is facilitated.

A process flow executing in a process engine gets messages that trigger events and sends messages as part of processing an event. These messages can be described using a standard web services definition language like WSDL. These descriptions can be easily discovered with standard registries like UDDI. Therefore, these messages can be grouped together into web services. The messaging system can route messages to the activities of this service to the connector executing the flow. Some operations can have the semantic of launching a new process instance. Messages to these operations will result in a new process instance. For other inbound messages, a dispatcher in the connector can link the message to an existing process instance by deducing the instance based on payload content, the state of the process instance (if it is at a step where it is waiting for a particular message to a particular operation) or message correlation data in the message envelope (useful when the inbound message is a asynchronous response to a previous outbound message).

Process flows that execute in a distributed fashion in multiple process engines 610, 620, 630, 640 passing their internal state between themselves can be treated as a set of collaborative services interacting with each other.

A further aspect of the present invention is optionally requiring subscription to a service prior to being invoked. During service subscription, for a collaborative service, one of the possible choreographies can be selected and agreed for use by both the consumer and provider. Other aspects of the service also can be agreed at subscription time, such as access control.

Service oriented access control has three key concepts that work together to facilitate manageability and enforcement of access to services and activities/operations in a service: service visibility, service subscription, and service privileges or authorizations. Service visibility allows the service provider to specify who can discover the service, and allows the discovery mechanism to restrict the discovery based on the visibility. The service visibility rules may include: visible to anyone, visible to administrator/operator, visible to specific parties in community, visible to specific roles in community, visible to any community in the network, or visible to specific communities in the network. Visibility also applies to collaboration parties (sometimes called trading parties or partners). When a party is registered in the community, the party is by default visible in the community. Additionally, the party can be made visible to any community in the network, or to specific communities in the network. Service and party information also can be pushed into public UDDI registries based on the visibility rules specified.

For each service activity, set of privileges also can be established at subscription time (or by default.) For each service, the application can also specify service roles that effectively are privilege groups. For a privilege, additional details can be specified, such as whether the privilege supports scope of specific organization units' and 'whether the privilege can only be used as part of a service role', etc. A Service can also specify if it requires some sort of subscription prior to someone using it. For example, a supplier may specify in an order management service, that buyers can send orders to this service only after subscribing. The subscription process allows the service provider to receive information regarding the subscribing party, as well as the capabilities of the subscribing service, if required.

Based on this information, the service provider may choose to approve the subscription or reject it. Once a party administrator subscribes to a service, they can create user roles within their own organization by grouping the service roles and/or privileges within the subscribed services and assigning these user roles to user accounts.

Figure 7:
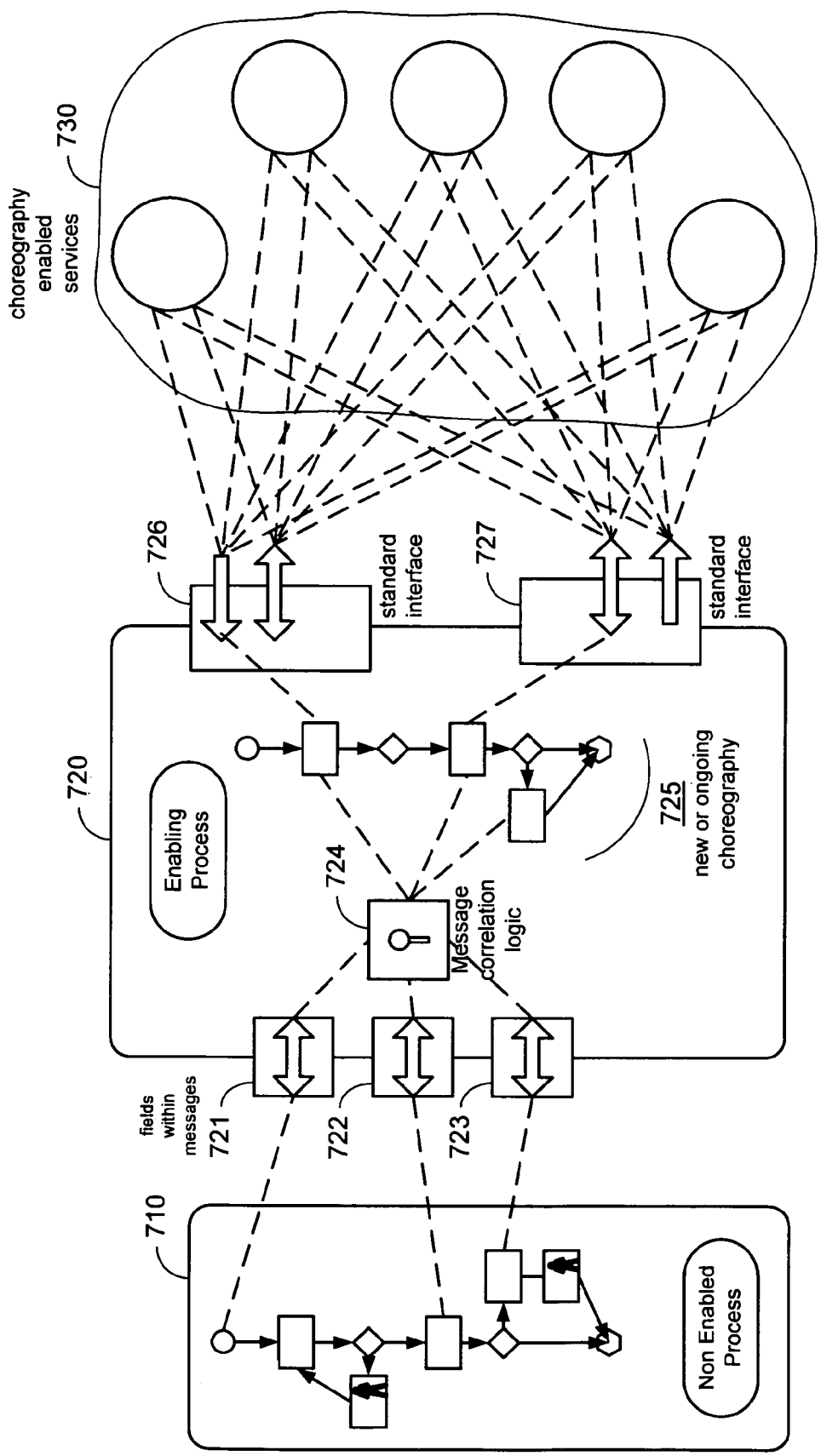
FIG. 7 illustrates message correlation.

Another major challenge for support of choreographed interactions is back office systems. Use of a service composition agent can address the problems associated with back office system integration. Back office systems typically do not understand SOAP extensions that support choreographed conversations, including extensions to support for message correlation and return address specification. Therefore, it is useful to have a composition agent expose a collaborative web services interface that is mapped bi-directionally to the simple web services interface of the back office system, as shown in FIG. 7. The composition agent correlates related messages by executing rules against the payload and deduces the return addresses of the applications from the peer-to-peer invocation message from the application. Back office systems expose their functionality differently, so there typically is a different set of service definitions for each back office system. A composition agent simplifies keeping track of multiple evolving back office systems by presenting them at a single interface. The composition agent selects the correct back office service and action. Back office systems support a variety of XML document definitions, when they have been augmented with EAI interfaces. Examples include xCBL, IDOC, OAGI, etc. Aspects of the present invention allow these document defined using this variety of definition languages to be treated as members of single document family. Translation logic can be invoked to convert messages back and forth between document family members. EAI interfaces to back office systems typically do not support rigorous security, reliable messaging, etc. The composition agent can support security, reliability, etc. between itself and inquiring services. The composition agent can use less robust and secure solutions can be used in the last hop between the back office system and the last native connector, or special security and reliability measures can be adopted.

The composition agent service can support logical routing (target address selection by payload examination and/or registry lookup) for conversations with the back office system, including conversations initiated by the back office system. Message correlation is illustrated in FIG. 7. A non choreography enabled system 710, such as a back end system, communicates with an enabling process or composition agent 720. The communications are configured, in part, by specifying fields within messages that the composition agent will receive 721, 722, 723. Message correlation logic 724 can be used to correlate messages with a new or ongoing choreography 725. This choreography can be modeled, as described above, as an internal process. The correlation logic 724 can be positioned in the message flow to process each message from the back end system as it is received. Or it can be a resource available to process steps in the process flow 725. The positioning of the correlation logic 724 is less important than its actions: inspecting messages generated by the back office application interfaces and using the specification of fields to correlate back office messages with a choreography instance. The correlation logic can be extended to conversations initiated by the back office system. When the correlation logic determines that the source of the message always initiates conversations or determines that there is no existing conversation that correlates with specified fields in the message, the correlation logic can signal that a new conversation instance needs to be created. The correlation logic further can use the specified fields to determine what choreography should be invoked. For instance, a back office system may initiate supplier orders. The supplier name field can be used to identify the proper CP and the service that the CP uses to receive new orders. A choreography associated with that service can be invoked. The composition agent 720 is exposed to choreography enabled services 730 through standard interfaces 726, 727. One or many services may interact with the composition agent through its service interfaces. The composition agent and the correlation logic track the status of the choreographed conversation and correlate messages exchanged with the back office system 710 to the appropriate conversation ID used in messages exchanged with other services 730.

Another aspect of the present invention is exposing a single hosted service through a plurality of aliases that are franchised by the host to service franchisees. Unlike franchisees in brick and mortar businesses, these franchisees are not expected to advertise the identity of the host. In a sense, these service franchisees are more like private labelers of OEM goods. The franchised services can be registered to interact with other services or they can be routes to one or more back office systems that the host is designed to support.

Figure 8:
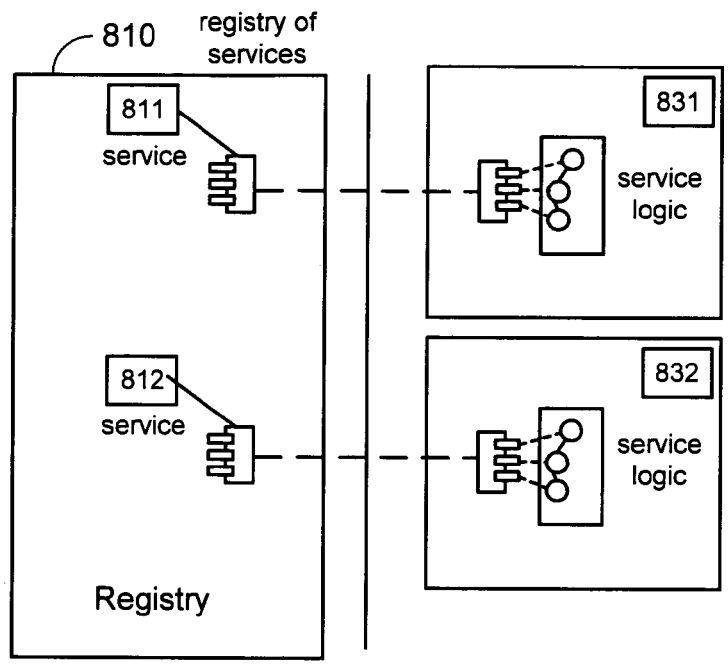
FIGS. 8 and 9 help distinguish between a regular, non-franchised service and a franchised service.
Figure 9:
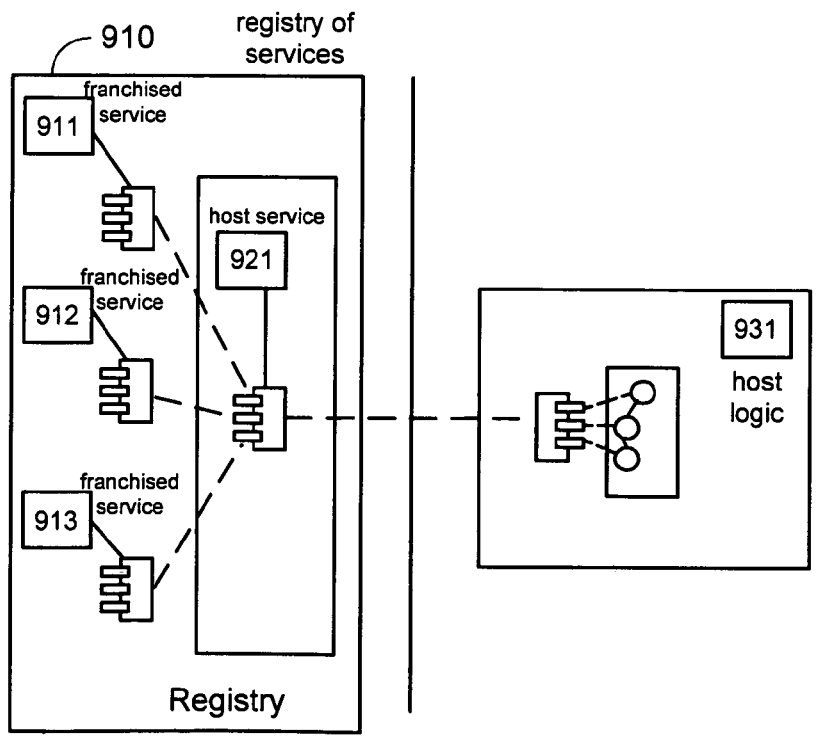

FIGS. 8 and 9 help distinguish between a regular, non-franchised service and a franchised service. In FIG. 8, two services 811, 812 appear in a registry of services 810. In the non-franchised scenario, these registry entries provide logical address that correspond to two different instances 831 and 832 of the same service logic. These instances of service logic are like two licensed copies of server infrastructure software running on two different web servers. In FIG. 9, three franchised services 911, 912, 913 appear in a registry of services 910. These franchised services have different logical addresses. All of them are logically connected to a host service 921, which is not exposed through the registry in the same way as the franchised services. Messages sent to the different logical addresses are in different contexts, corresponding to the franchisees of the three franchised services. With the context set by the logical relationship between the franchised services 911, 912, 913 and the host 921, the franchiser who has franchised the host 921 can use one instance of the host logic 931, instead of running instances of the logic 831, 832 for each registered service.

Consider a use case in which a marketplace operator hosts an order management application (a collection of services). A set of suppliers then franchise this hosted services package to manage all orders for them. In this case, messages to a franchisee are addressed to the <franchisee CP>, <service definition>, <activity definition>. Both UI and document exchange services are franchised. In practical terms, one embodiment of implementing franchised services involves the following steps. 1. Create a host instance of a service. 2. Create a host package by collecting a set of host services together. The hosting entity is the owner of the package. Also the package is tied to a connector where the actual implementation lives. 3. Associate to the host package a set of services that are subscribed by the franchisee that allow the franchisee to process the received documents. This allows one or more franchisees to franchise the host package. Steps 1 and 2 should, in some environments, be done by the community administrator, while step 3 can be done by a service provider.

A franchise collaborative service can optionally delegate authentication in the registry to the hosting services CP. One reason for this would be that the franchisee does not want to use the franchisee's credential because the franchisee does not want to identify itself completely. In this case, the franchisee will delegate authentication to the hosting CP for all messages from this service on behalf of this franchisee.

The franchised service is like a 'pass-through' service that sets a context and allows all information to simply flow to the host service and get processed by the host service. The franchise service will have a reference to the host service, and generally will inherit the implementation capabilities and policies from the host, with some overrides allowed based on business need. Preferably, there is no implementation tied directly to the franchise service. If customization is required, it is preferred to offer multiple hosted service variations. Alternatively, multiple choreographies might be supported by a hosted service and a subset of the choreographies supported for a particular franchised service. Messages to a franchisee are addressed to the <franchisee CP>, <service definition>, <activity definition>, as if the franchisee were operating a standalone service. Service consumers can interchangeably subscribe to and use regular or franchise services. Service consumers interacting with franchisees do not see any difference franchised and non franchised services.

A host service package is a package that consists of all the services implemented generally by a hosted application. A single hosted application can publish multiple host packages. In most cases, a hosted application will publish a single host package. Services bundled with a host service package may be grouped into two types. One type of host services is 're-offered' as franchised services on behalf of the franchisee. Another type includes portal (or UI) services used by the franchisee to process information received through the franchised services, but not re-offered or exposed beyond the franchisee. For example, an order management package may have a standards based 'receive orders' service and also have other UI services such as 'view orders', 'order reports', 'approve orders' etc. When a franchisee signs up to franchise the order management package, he/she needs to be able to not only receive orders through the standards based document exchange service, but also view them and approve them etc. A Host Package has a package connector that will be the default connector for each service in the package to send or receive messages.

A business process between the Franchisee and the Host provider is enabled to allow the franchisee to franchise the host package online, with an online approval process, where required. When a service provider franchises the host package, a franchised service is automatically created and registered as a pass-through to each host service in the package. Further, the franchisee is also automatically subscribed (and hence authorized to use) the other subscription services in the package, when the franchise is registered.

A franchise service can optionally delegate authentication to the host service, as previously mentioned. In one embodiment, the practical steps involved in delegating authentication on the host side may include: 1. Create a host instance of a service (typically only document exchange services). 2. Create the regular services that will be used by the franchisee as part of the package. 3. Create a host package & specify the collection of host services that will be enabled as provided by the franchisee. 4. Associate a connector for the host package that will send/receive messages for the host services. 5. Associate the set of services that are subscribed by the franchisee that allow the franchisee to process the received documents. 6. Host provider can specify on the package whether approval is required when a franchise is requested. 7. Host provider can specify if delegated authentication is allowed on this package. On the franchisee side: 1. Franchisee request franchise of a host package. This triggers an approval process if required by the Host Provider. 2. Host Provider receives notification to approve the request, and either approves or rejects the request. 3. If Host Provider approves the request, system creates a franchise package, subscriptions to the subscription services in the package, and franchise services for the franchise-able services in the package.

To facilitate understanding of franchised services, a supplier facing order management system is considered. For this discussion, this system is called SOMS (Supplier Order Management System). SOMS provides an order management system that can be used by suppliers to receive orders from buyers. In one embodiment, the following steps may be involved in designing and setting up SOMS. The designer divides the services to be published into groups including services to be franchised by the franchisee (e.g., receive orders, check order status etc.), services to be used (or consumed) by the franchisee (e.g., view orders, approve/reject orders, order statistics/reports etc.), and services that application provides for A2A (application-to-application) integration such as integration with other applications or back office systems. (e.g., integration with user management systems, public registries, catalog systems, etc.) The designer determines whether all franchisees will have the same set of services or if they may potentially need different subsets. Based on this need, identify one host service package or multiple host service packages, or, alternatively, multiple choreographies of the same service. The host service package should contain the 'to-be-franchised' services and 'for-use-by-franchisee' services. The other services used for integration are typically registered as regular services with the providing cp as the application or the host provider. In a community environment, the host provider is typically the community operator, but it may also be any of the collaboration parties in the community. It should be kept in mind during design that the 'to-be-franchised' services will actually be receiving and sending messages on behalf of multiple service providers. Hence the application business logic needs to use the addressee in the message as a context for processing the messages. A host service implementation should look at an incoming message to figure out the recipient CP and trigger/map to the appropriate business process. For UI triggered business processes, the host service should take the franchisee CP as an input to the process context, and use this in the delegation policies within the process.

Figure 10:
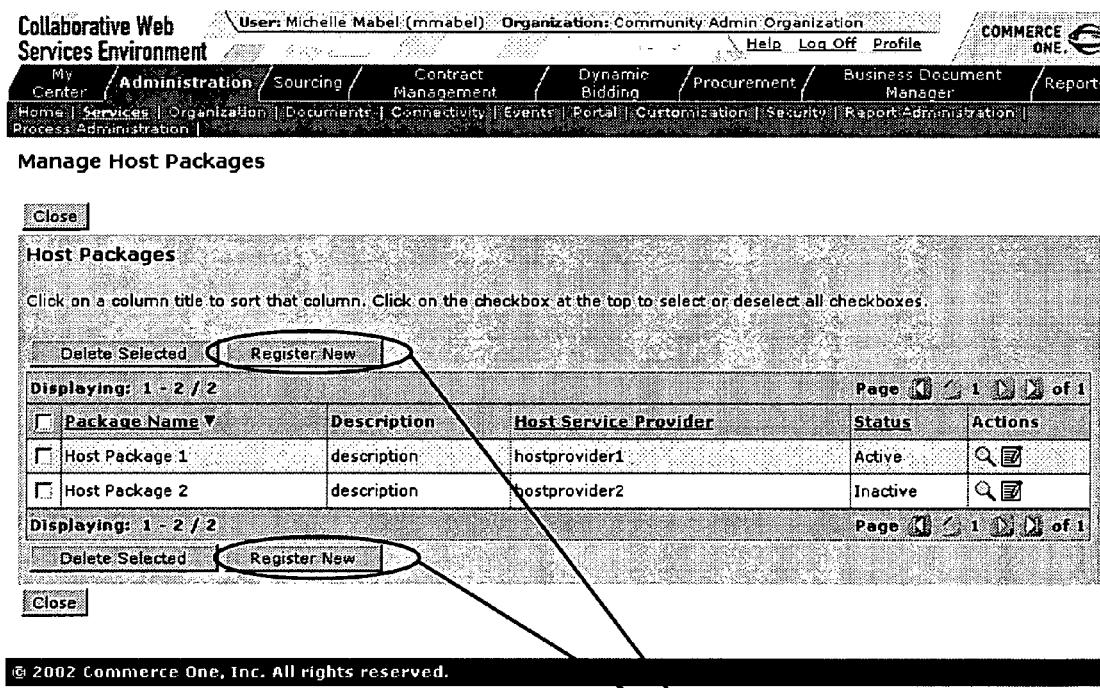
Figure 11:
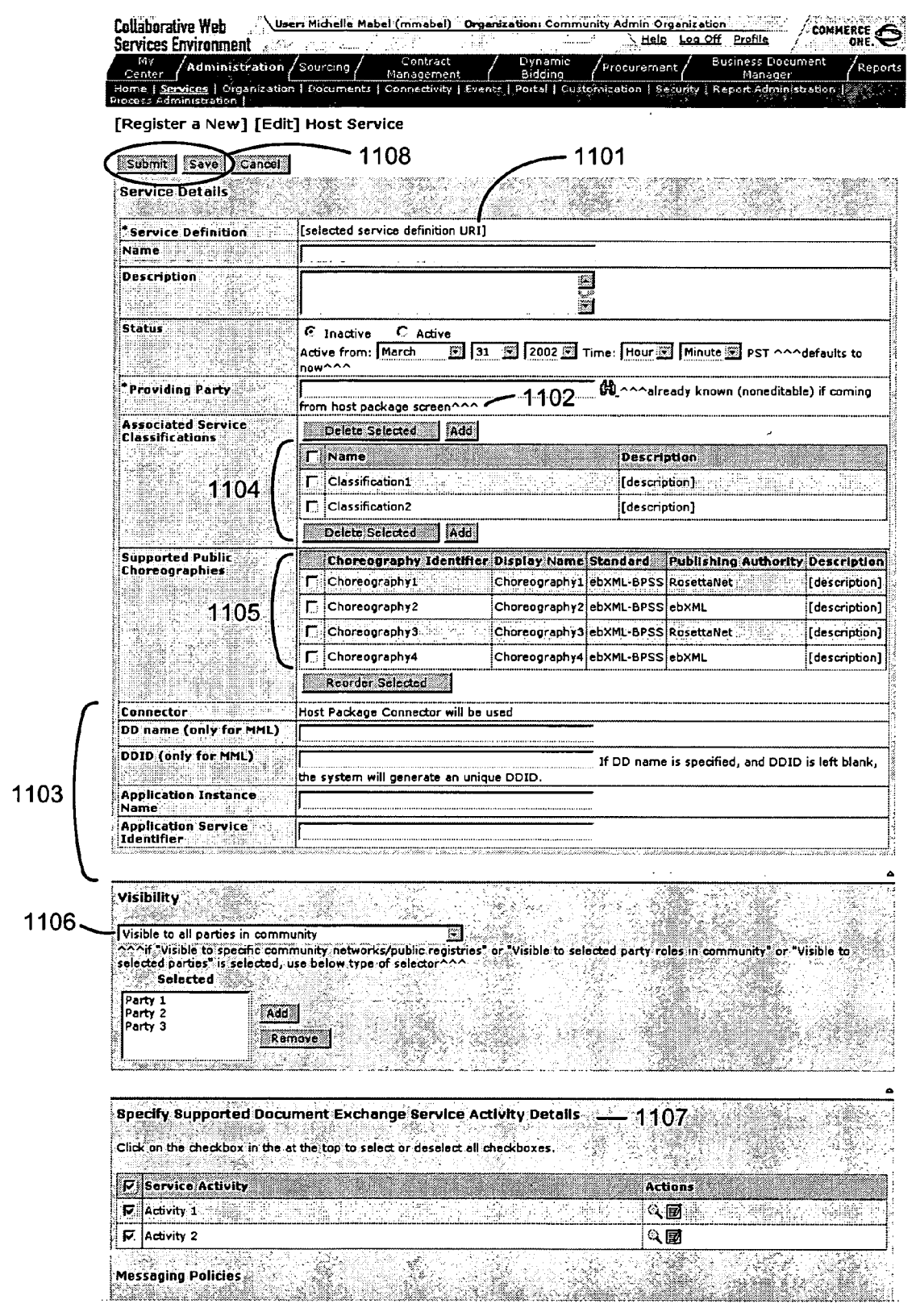
Figure 13:
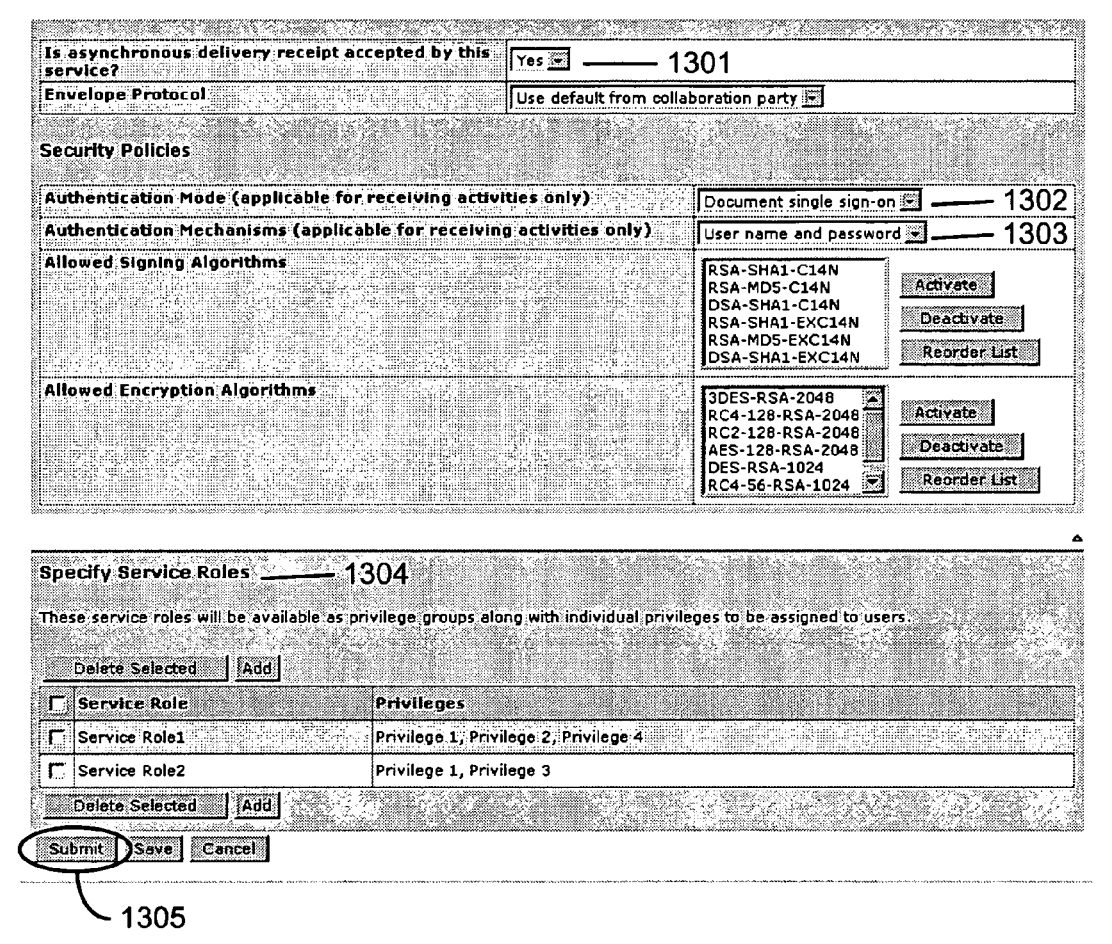

After design and coding, the sample SOMS service will need to be registered, at least in some embodiments. Registration of services to be franchised, services to be used by franchisees and the host service package itself is illustrated by several setup screens in the figures. One part of registration is to register the host services to be franchised. In one embodiment, a registry manager UI is used to create a new service definition for the service (if it does not exist already). Then verify that a connector is available for your application. This may be a default connector available to a franchiser or a separate connector registered for to the franchiser's application. Also verify that any required document identifiers have been loaded into the registry. Then, create the host services as follows. FIG. 10 is a manage host packages screen. Click on 'Register New' 1001. FIG. 11 depicts parts of registering a new host service. Select a service definition 1101. Pick the operator party as the "Providing Party" 1102 or use a different party as appropriate. Specify the service information 1103, leaving the 'Application Instance Name' and 'Application Service Identifier' blank. Optionally, specify any service classifications 1104 that should be associated with this service. Select the choreographies that are supported by this service 1105, and the order of preference. Set the visibility 1106 to default setting, which is 'Visible to All Parties in Community'. Select the supported document exchange activities 1107 and edit the activities using a screen such as FIG. 12. Create privileges 1201. Leave the defaults for the 'Messaging Policies' 1202 unless your application needs special delivery receipt handling. For input 1210 and/or output 1220 messages, set signing and encryption policies 1213, 1223 to 'required'. Edit required parts 1214, 1224 and specify an ordered list of the supported document identifiers. Add optional message parts, which may be published in the registry. Using a screen such as FIG. 13, verify or modify the policies as follows: Set asynchronous delivery receipt 1301 to 'Yes'. Set 'Authentication Mode' 1302 to 'Document Single Sign-on'. Set 'Authentication Mechanism' 1303 to 'Username/password'. Then, optionally, specify any service roles 1304. Click on 'Submit/Save' 1305 to register the service.

Another part of registration is to register regular services to be used by the franchisee (as opposed to hosted services.) This is done in the manner normal to web services development.

Figure 14:
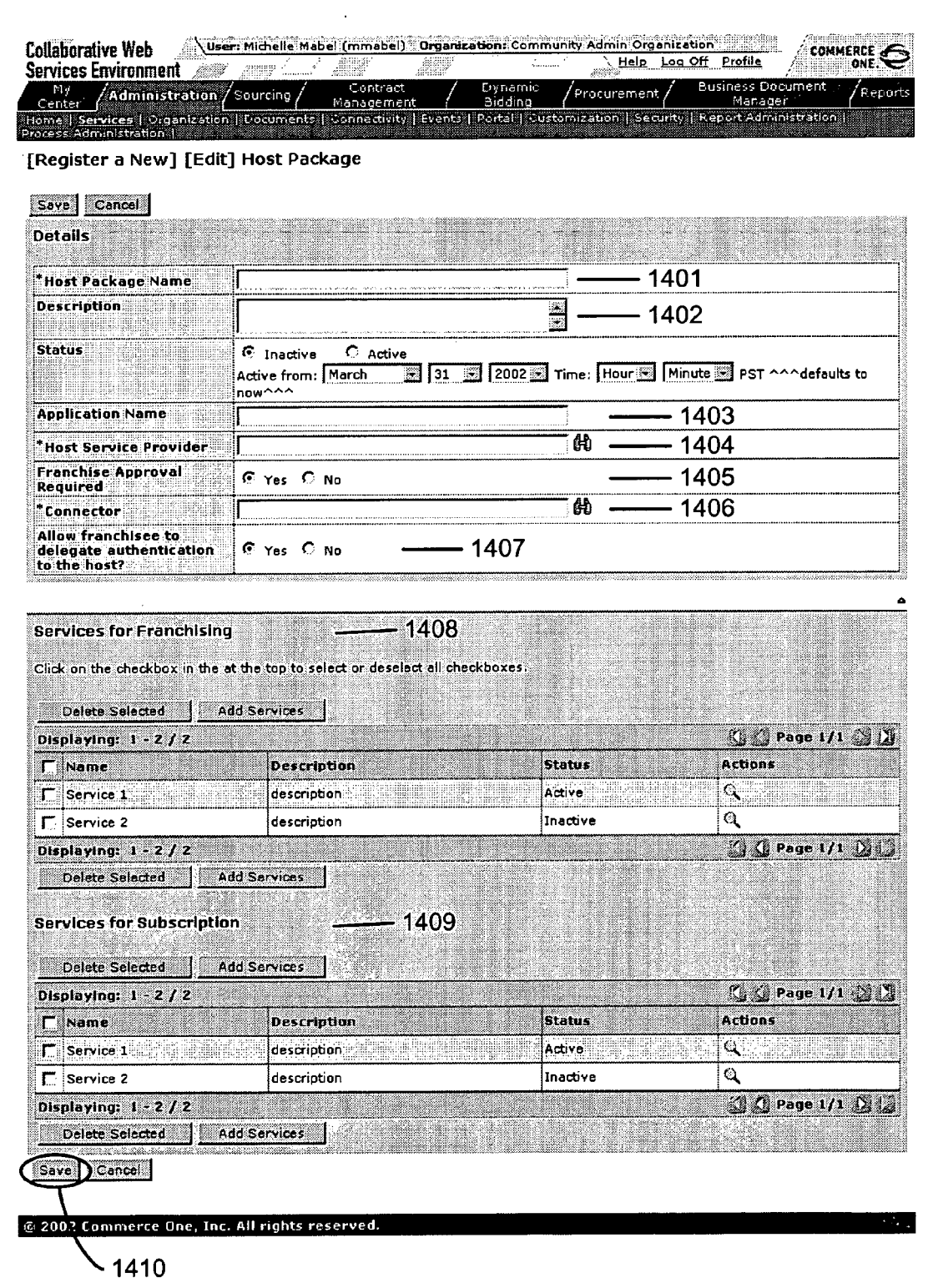

The host service package also is registered, using screens such as FIG. 14. At the 'Register a New Host Package' screen, specify a package name 1401, and description 1402. Specify an application name 1403. Pick the operator party as the 'Host Service Provider' 1404 or use a different party as appropriate. Specify the service information (keep the Application Instance Name and Application Service Identifier 'blank')Specify if approval is required for franchising this package 1405. If 'Yes', an approval process will be triggered when a CP franchises this package. Specify the application connector 1406. Specify if the franchisee is allowed to delegate authentication to the host service provider 1407. Select the services to be franchised by the franchisee, out of the list of host services offered by the host service provider 1408. Select the list of services to be subscribed by the franchisee, out of the list of regular services offered by the host service provider 1409. Click on 'Save' 1410 to register the host service package.

Figure 15:
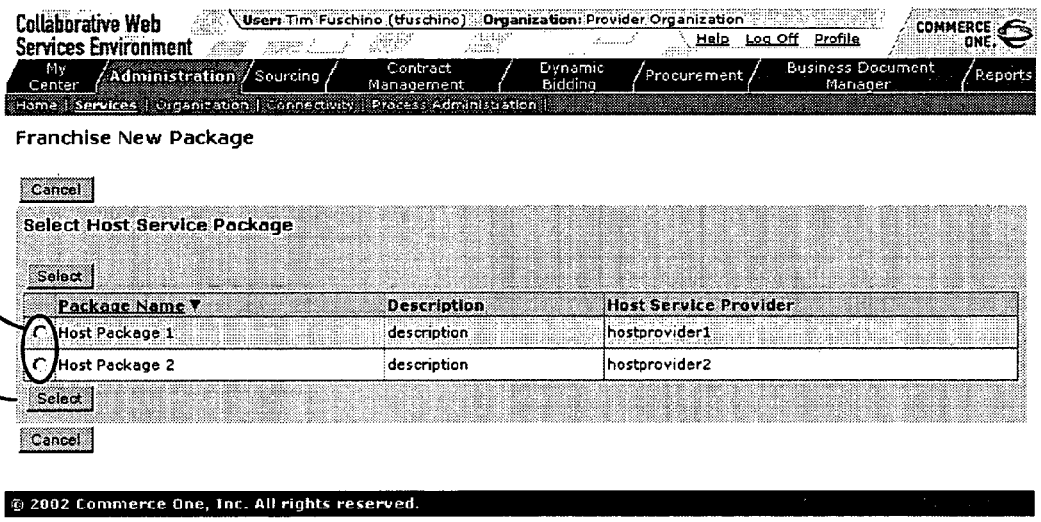
Figure 16:
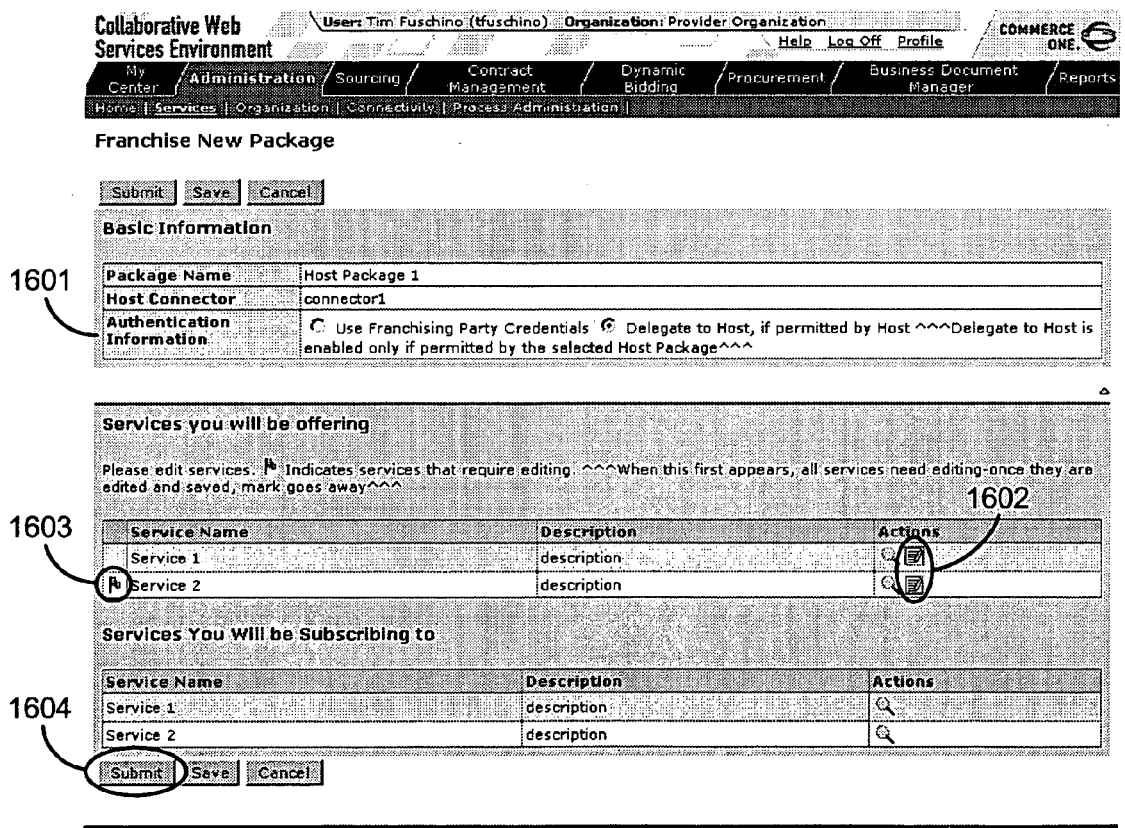

The franchisee also registers, selecting a new package to franchise from a screen such as FIG. 15. One or more host packages are selected by selecting radio buttons 1501 and clicking 'Select' 1502. A screen such as FIG. 16 becomes accessible. The franchisee's options are limited, so the set up is straightforward. In an alternative embodiment, the franchisee would have options regarding services to offer and/or services to subscribe to, especially in circumstances when the franchisee was re-offering the services. Decide whether authentication will use the franchisee's credentials or will be delegated to the host 1601. Edit one or more services to be offered 1602, satisfying any indicated requirements 1603 for editing. Select 'Submit' 1604 to submit the franchise for processing.

When service details are edited, a screen such as FIG. 17 become accessible. In some embodiments, most of the details presented will only be editable by the host, not the franchisee. This can be seen by comparing FIG. 17 with FIGS. 11 and 13. Some of the details presented apply to downstream users, to whom the service is re-offered, in the same manner in which the host applies them to the franchisee. The descriptions of FIG. 11 generally apply. In addition, service roles, which group privileges, can be established, as described above.

Some of the services that a franchisee may subscribe to are portal services. A portal service (or an UI service) is a service that is accessed through a portal. These are simply the services exposed by an application to enable users to interact with the application. This allows users to have a service-oriented view of applications. A specific user may interact with services from different application, and may/may not interact with all services from one application. In any of these cases, the experience across the applications in terms of administration, access control/privileges, single sign on, navigation etc. will be the same, and based on services paradigms.

A portal service may not have a service definition. (There are no standards yet. While the present embodiment does not require a service definition for portal services, it is envisioned that in the future there will be a service definition for portal services.) A portal service has a list of registered activities (along with the URLs, if necessary) that can all be accessed through the portal. For activities, lists of privileges that enable access to the activity are also specified. Additionally, single sign on (SSO) information such as web agents and protected resource paths are also specified for the service or for each activity. Access to reports may also enabled through portal services, by registering report groups/folders as activities.

It is useful to consider several factors when identifying the UI services to be registered for an application. Consider the target users or parties. Application interfaces are designed for use by different target users. For example, certain UI's are meant for administrators, certain UI's are meant for buyers, certain UI's are meant for Suppliers, etc. These role differentiated UI's should be separate services. Consider if certain interfaces are targeted for only certain classes of suppliers or buyers. For example, you may want to enable additional functionality for advanced suppliers only. Keep these in separate services.

If you have many services targeted to one target group (e.g., suppliers), consider creating service subscription packages to group these for user convenience. Collaboration parties subscribe to a service, and users within the party are granted specific privileges within the service. This means that privileges and activities across parties should not be mixed. For example, buyer submit RFP and seller respond to RFP privileges should be in two different services.

For the portal services, a specific display category may be associated. The display category reserves a tab on the portal for the service. Many portal services can be in one display category. A display category is associated with a service room URL specified by the application. By registering the service room URL, the application retains full control on how the services are rendered in the portal within the tab. If you would like your application to be rendered as multiple display categories, identify services based on the display category they are associated with.

Preferably, the following relationships among services, activities, privileges, and web agents are observed. 1. Service can have one or more activities. 2. An Activity can be associated with zero or more privileges. 3. Privileges belong to and are unique within a service. 4. A Privilege can be associated with one or more activities in the same service. 5. A Service can be associated with a default web agent that handles single sign on (SSO) along with a list of web resource paths that are accessible through the service. 6. Each activity in the service can either be associated with the service web agent, or overridden with a different web agent. Access to activity specific resource paths can also be specified.

It is useful to consider several factors in identifying the activities and privileges in UI services. 1. Activities & privileges in a service should be targeted within a collaboration party. This means that privileges and activities across parties should not be part of the same service. Again, buyer submit RFP and seller respond to RFP privileges should not be in the same service. 2. It is not preferred to register every link in the application as an activity in a UI service. If access control is required, these can be registered as privileges. 3. In the simple case, a portal service can register just one activity and a bunch of privileges. For example, there could be 'auction bid' service that has one activity 'bid' with a set of privileges that allow specific bidding functionality. Based on the privileges assigned to the user, the application can choose to render completely different pages, or the same page with different options enabled. If links to these activities are enabled from other applications/services, a user may want to register more granular activities, along with the URL so that these can be discovered through the registry. For example, Catalog Management may want to register 'search catalog' activity, along with 'manage catalog' activity. The 'search catalog' activity may be presented as a link on procurement screens, source screens, and contract management screens, as well as manage catalog screens. 5. If certain links in a service are hosted in a different application server or web server and need a separate web agent to protect them, these can either be grouped into a separate service, or registered as separate activities in the same service. (E.g., product configuration activities that may run on a different web server from the rest of the catalog service activities).

While the present invention is disclosed by reference to the preferred embodiments and examples detailed above, it is understood that these examples are intended in an illustrative rather than in a limiting sense. From the preceding description, it will be apparent to those of skill in the art that a wide variety of systems and methods can be constructed from aspects and components of the present invention. Computer-assisted processing is implicated in the described embodiments. Accordingly, the present invention may be embodied in methods for computer-assisted processing, systems including logic to implement the methods, media impressed with logic to carry out the methods, data streams impressed with logic to carry out the methods, or computer-accessible processing services. It is contemplated that modifications and combinations will readily occur to those skilled in the art, which modifications and combinations will be within the spirit of the invention and the scope of the following claims.

We claim as follows:

1. The method of supporting web service interoperability among a plurality of service entities, including determining at run-time:
    a particular version of a message choreography to be used for exchange of messages among the entities, wherein versions of the message choreography use substantially the same first message;
    service versions in use by one or more service providers among the service entities; and
    document versions to be used by the service entities in the message exchanges and translations, if needed, among the document versions.

2. The method of claim 1, wherein the method is adapted to a plurality of choreography definition languages.

3. The method of claim 1, wherein the method is adapted to a plurality of service entity interface definition languages.

4. A method of choreographing web services, wherein a choreography includes a plurality of messages mapped to standard-compliant interfaces of a plurality of service entities, assigning a conversation identifier to the messages, and conducting message exchanges among the service entities according to the choreography, the method including:
    maintaining choreography versions of a choreography, wherein the choreography versions use substantially similar first messages; and
    responsive to a first message, determining a particular message choreography version supported by the service entities and utilizing the particular choreography version after the first message.

5. The method of claim 4, wherein determining a message choreography version includes accessing a registry that identifies choreography versions supported by the service entities.

6. The method of claim 5, wherein the registry further identifies preferences of the service entities among the supported choreography versions and determining further includes utilizing the preferences of at least one of the service entities.

7. The method of claim 4, wherein the messages include documents, further including:
    maintaining document versions of the documents and translation logic to convert among versions; and
    determining particular document versions to be used by the service entities and translations, if needed, among the particular document versions.

8. A method of choreographing web services, wherein a choreography includes a plurality of messages mapped to standard-compliant interfaces of a plurality of service entities, assigning a conversation identifier to the messages, and conducting message exchanges among the service entities according to the choreography, the method including:
    maintaining choreography versions of a choreography, wherein the choreography versions use substantially similar first messages;
    maintaining in a registry data that identifies choreography versions supported by the service entities;
    accessing the registry and determining a particular message choreography version supported by the service entities; and
    utilizing the particular choreography version for the message exchanges.

9. The method of claim 8, wherein the registry further identifies preferences of the service entities among the supported choreography versions and determining further includes utilizing the preferences of at least one of the service entities.

10. The method of claim 8, wherein the messages include documents, further including:
    maintaining document versions applicable to the documents and translation logic to convert among versions; and
    determining particular document versions to be used by the service entities and translations, if needed, among the particular document versions.

* * * * *